United States Patent
Feng et al.

(10) Patent No.: US 11,746,724 B2
(45) Date of Patent: Sep. 5, 2023

(54) METHOD FOR PREVENTING ACCUMULATION OF CYLINDER OIL AT SCAVENGING PORTS OF LOW-SPEED MARINE ENGINE

(71) Applicant: DALIAN UNIVERSITY OF TECHNOLOGY, Liaoning (CN)

(72) Inventors: Liyan Feng, Liaoning (CN); Min Pan, Liaoning (CN); Wenjing Qu, Liaoning (CN); Zhen Gong, Liaoning (CN); Zhengran Yu, Liaoning (CN); Hongjie Sun, Liaoning (CN); Zixin Wang, Liaoning (CN); Qiang Liu, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 55 days.

(21) Appl. No.: 17/310,358

(22) PCT Filed: Dec. 17, 2019

(86) PCT No.: PCT/CN2019/125858
§ 371 (c)(1),
(2) Date: Feb. 22, 2022

(87) PCT Pub. No.: WO2020/155897
PCT Pub. Date: Aug. 6, 2020

(65) Prior Publication Data
US 2022/0186677 A1    Jun. 16, 2022

(30) Foreign Application Priority Data
Jan. 29, 2019    (CN) .......................... 201910088172.1

(51) Int. Cl.
F02F 1/20   (2006.01)
F02F 1/22   (2006.01)
F01M 11/02  (2006.01)

(52) U.S. Cl.
CPC .............. *F02F 1/20* (2013.01); *F01M 11/02* (2013.01); *F02F 1/22* (2013.01)

(58) Field of Classification Search
CPC .... F02F 1/20; F02F 1/22; F01M 11/02; F16N 2210/06
See application file for complete search history.

(56) References Cited

U.S. PATENT DOCUMENTS

| | | | |
|---|---|---|---|
| 2,746,446 A * | 5/1956 | Laubender | F01M 11/00 123/193.2 |
| 4,945,864 A | 8/1990 | Solomon et al. | |
| 7,895,978 B2 * | 3/2011 | Moss | F02B 25/02 123/193.2 |

FOREIGN PATENT DOCUMENTS

| | | |
|---|---|---|
| CN | 1076992 A | 10/1993 |
| CN | 106837586 A | 6/2017 |

(Continued)

*Primary Examiner* — Grant Moubry
(74) *Attorney, Agent, or Firm* — NKL Law; Allen Xue

(57) ABSTRACT

Provided is a method for preventing the accumulation of cylinder oil at scavenging ports of low-speed marine engines. An oil passage is provided on a cylinder wall inside a cylinder. The oil passage includes multiple oil storage grooves processed in a circumferential direction of the cylinder wall. The oil passage is formed by obliquely extending from the inner side of the cylinder wall to the outside of the cylinder in a radial direction of the cylinder. The scavenging ports are uniformly distributed in a circumferential direction of the cylinder wall, and each of the oil storage grooves is correspondingly processed at an upper portion of the scavenging port upper edge of the scavenging (Continued)

port. Each of the oil storage grooves has a shape matching the curved surface of the scavenging port upper edge.

7 Claims, 5 Drawing Sheets

(56) References Cited

FOREIGN PATENT DOCUMENTS

| | | |
|---|---|---|
| CN | 106907238 A | 6/2017 |
| CN | 106285995 B | 9/2018 |
| CN | 207879482 U | 9/2018 |
| CN | 109798197 A | 5/2019 |
| JP | S6313964 A | 1/1988 |

* cited by examiner

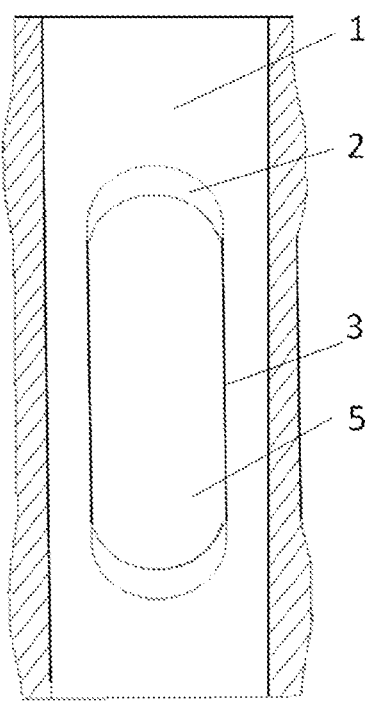 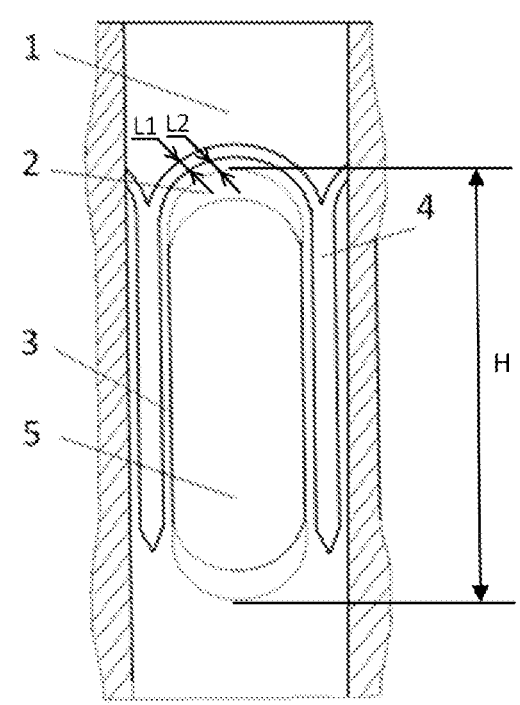
Prior Art
FIG. 2
FIG. 3

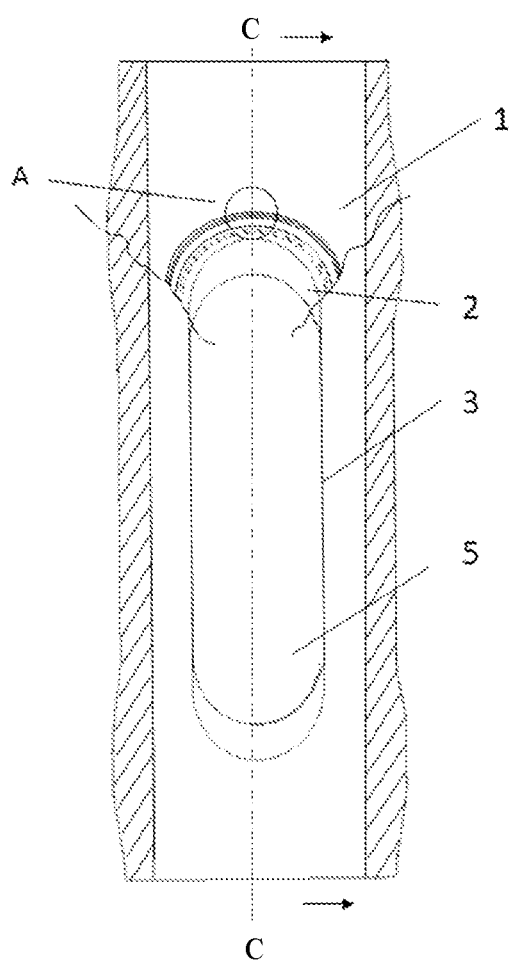
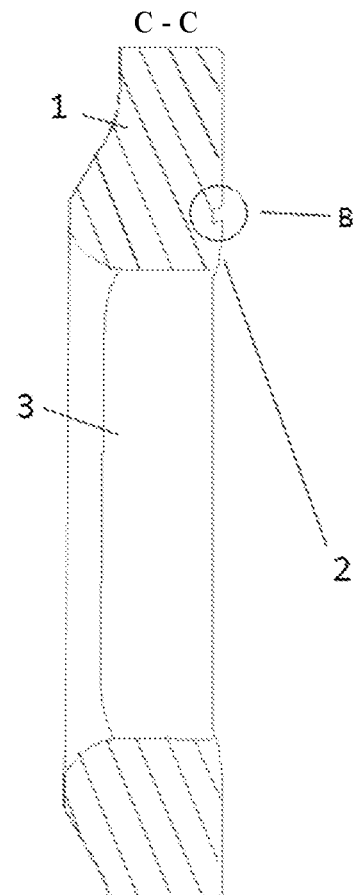
FIG. 6
FIG. 7

METHOD FOR PREVENTING ACCUMULATION OF CYLINDER OIL AT SCAVENGING PORTS OF LOW-SPEED MARINE ENGINE

TECHNICAL FIELD

The present disclosure belongs to the technical field of cylinder oil spontaneous combustion control, in particular to a method for preventing the accumulation of cylinder oil at scavenging ports of low-speed marine engines.

BACKGROUND

Under the trend of global environmental protection, the problem of marine engine emission has always been the focus of attention. Gas-fuel marine engines can meet the requirements of emission regulations in IMO Tier 3 without aftertreatment.

In recent years, due to the adoption of advanced technologies such as lean burn, Miller cycle, two-stage turbocharging, and the like, the thermal efficiency and average effective pressure of gas-fuel engines have been significantly improved, but the frequent detonation has become an obstacle to further improve the performance of the engine at the same time.

Among many factors causing detonation, the auto-ignition of cylinder lubricating oil (hereinafter referred as cylinder oil for short) is the most important and also the most complex one. Once the free cylinder oil in the cylinder self-ignites before the spark ignition or microinjection ignition, it will lead to the pre-ignition of premixed fuel gas-air mixture in the cylinder, causing a sharp rise of the pressure in the cylinder, the maximum in-cylinder pressure too high, and the heat release too fast, so that the mechanical load and thermal load of the engine components are too high, resulting in safety risks to the engine. Especially, the consumption of the cylinder lubricating oil of low-speed two-stroke dual-fuel engine is large, and the cylinder lubricating oil droplets will directly enter the cylinder, which is an inducing factor of pre-ignition.

The cylinder oil accumulated at the scavenging port upper edge is stripped into the cylinder under the blowing of the scavenging airflow, which is an important source of the free cylinder oil droplets in the cylinder. Therefore, in order to effectively prevent the auto-ignition of cylinder oil, reduce the harm caused thereof and further improve the performance of the engine, it is necessary to prevent the accumulation of cylinder oil at the scavenging port upper edge from the source.

SUMMARY OF THE INVENTION

According to the problems mentioned in the above background that once the free cylinder oil in the cylinder self-ignites before ignition, inevitably leading to the pre-ignition of the premixed gas, resulting in too high maximum in-cylinder pressure and too severe combustion, which will cause harm to the engine. The present disclosure provides a method for preventing the accumulation of cylinder oil at the scavenging ports of low-speed marine engines. The present disclosure mainly uses the oil passage arranged on the cylinder wall inside the cylinder, so as to prevent the accumulation of cylinder oil from the source.

The technical solutions of the present disclosure are as follows:

A method for preventing the accumulation of cylinder oil at scavenging ports of low-speed marine engine, an oil passage is arranged on a cylinder wall inside a cylinder to avoid the accumulation of the cylinder lubricating oil at the scavenging port upper edge of low-speed two-stroke marine engine.

The oil passage includes a plurality of oil storage grooves processed in a circumferential direction of the cylinder wall; the oil passage is formed by obliquely extending from an inner side of the cylinder wall towards the outside of the cylinder in a radial direction of the cylinder; the scavenging ports are uniformly distributed in a circumferential direction of the cylinder; each of the oil storage grooves is correspondingly processed at an upper portion of a scavenging port upper edge of the scavenging port, and each of the oil storage grooves has a shape matching a curved surface of the scavenging port upper edge; and the adjacent oil storage grooves are in tangential communication with each other at the bottom; or oil discharge grooves are provided between the scavenging port side edges of the adjacent scavenging ports, and the top of the oil discharge groove is in communication with the bottoms of the two adjacent oil storage grooves.

Further, an upper surface and a lower surface of the oil passage are parallel; an angle between the upper surface and the cylinder wall is an obtuse angle of $\alpha$, and $100° \leq \alpha \leq 110°$; an angle between the lower surface and the cylinder wall is an acute angle of $\beta$, and $70° \leq \beta \leq 80'$; and a groove depth along the upper surface and the lower surface towards the inner part of the cylinder wall is 2 to 5 mm.

Further, a connection between the upper surface of the oil passage and the cylinder wall is provided with an upper notch transition chamfer; a connection between the lower surface of the oil passage and the cylinder wall is provided with a lower notch transition rounded corner, and the inner portion of the oil passage is provided with a groove rounded corner.

Further, when the adjacent oil storage grooves are in tangential communication with each other at the bottom, the oil passage is a short oil passage arranged at the upper portion of the scavenging port upper edges in a "wavy" shape; and the shape of the oil passage is matched with the shape of the scavenging port upper edges.

Further, when oil discharge grooves are provided between the scavenging port side edges of the adjacent scavenging ports and the top of the oil discharge groove is in communication with the bottoms of the two adjacent oil storage grooves, the oil passage is a long oil passage arranged at the upper portion of the scavenging port upper edge and outside the scavenging port side edge in an "arch" shape; and the shape of the upper portion of this oil passage is matched with the shape of the scavenging port upper edge.

Further, the width of the oil passage is 2 to 5 mm, and the distance between the oil passage and the outer edge contour of a scavenging port is 2 to 5 mm.

Further, the bottom of the oil discharge groove exceeds the scavenging port.

Further, $L_1$ represents the width of the oil passage; $L_2$ represents the distance between the oil passage and the outer edge contour of the scavenging port; H represents a long axis length of the scavenging port, and $0.02H \leq L_1 \leq 0.05H$, $0.02H \leq L_2 \leq 0.05H$.

Compared with the prior art, the present disclosure has the following advantages:

1. The present disclosure uses the oil passage arranged in the cylinder wall inside the cylinder to prevent the accumulation of cylinder oil at the scavenging port upper edge; and by preventing the cylinder oil near the scavenging port from being stripped to enter the cylinder in a free state under the blowing of scavenging gas, thus the spontaneous combustion of cylinder oil in the cylinder of the low-speed two-stroke marine engine is controlled from the source.

2. The present disclosure uses the oil passage arranged in the cylinder wall inside the cylinder to greatly reduce the number of free cylinder oil droplets in the cylinder and reduce the possibility of pre-ignition. By effectively reducing the probability of pre-ignition, the performance of the engine is improved and the PM (Particulate Matter) emission is reduced, saving the PM aftertreatment cost.

3. In the present disclosure, when the adjacent oil storage grooves are in tangential communication with each other at the bottom, a short oil passage scheme is formed; or, when oil discharge grooves are provided between the scavenging port side edges of the adjacent scavenging ports and the top of the oil discharge groove is in communication with the bottoms of the two adjacent oil storage grooves, a long oil passage scheme is formed. The two solutions provided can be adapted to different engine lubricating conditions. For general engine types, the long oil passage scheme is adopted to ensure that no residual cylinder oil accumulates at the edge of the scavenge port; and for special engine types with better lubricating conditions, less lubricating oil consumption, lower pressurization pressure, thinner cylinder wall or higher cost control requirements, the short oil passage scheme can be selected to avoid the accumulation of cylinder oil at the scavenging port upper edge.

DETAILED DESCRIPTION OF DRAWINGS

To describe the technical solutions in the embodiments of the present disclosure or the prior art more clearly, the following briefly describes the accompanying drawings required for describing the embodiments or the prior art. Apparently, the accompanying drawings in the following description show some embodiments of the present disclosure, and a person of ordinary skill in the art may still derive other accompanying drawings from these accompanying drawings without creative efforts.

FIG. 2 is a schematic diagram of the cylinder wall in the prior art.

FIG. 3 is a schematic diagram of the cylinder wall of the present disclosure.

FIG. 6 is a main sectional view of the cylinder wall of the present disclosure.

FIG. 7 is a side sectional view of the cylinder wall of the present disclosure.

Figure 1:
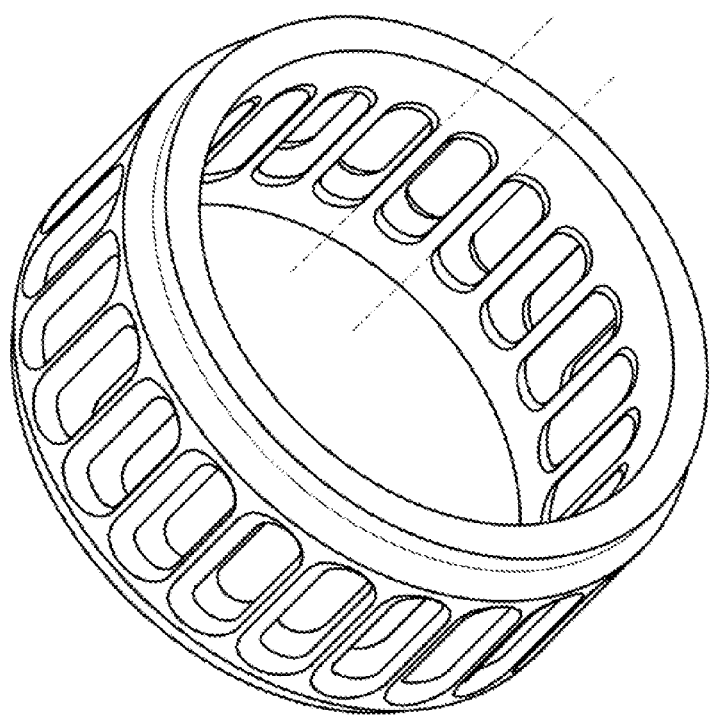
FIG. 1 is a local schematic diagram of the cylinder near the scavenging port.

Wherein, 1. cylinder wall, 2. scavenging port upper edge, 3. scavenging port side edge, 4. oil passage, 41. oil storage groove, 42. oil discharge groove, 5. scavenging port, 6. upper notch transition chamfer, 7. lower notch transition rounded corner, 8. groove rounded corner

DETAILED DESCRIPTION OF PREFERRED EMBODIMENTS

It should be noted that, in the case of no conflicts, the embodiments and the features in the embodiments of the present disclosure can be combined mutually. The present disclosure will be described in detail below with reference to the accompanying drawings and the embodiments.

To make the objectives, technical solutions, and advantages of the present disclosure clearer, the following clearly and completely describes the technical solutions in the embodiments of the present disclosure with reference to the accompanying drawings in the embodiments of the present disclosure. Apparently, the described embodiments are merely some rather than all of the embodiments. The following description of at least one exemplary embodiment is actually only illustrative, and in no way serves as any limitation on the present disclosure and its application or use. Based on the embodiments of the present disclosure, all the other embodiments obtained by those of ordinary skill in the art without inventive effort are within the protection scope of the present disclosure.

It should be noted that the terms used herein are only intended to describe specific embodiments and are not intended to limit the exemplary embodiments of the present disclosure. As used herein, unless indicated obviously in the context, a singular form is intended to include a plural form. Furthermore, it should be further understood that the terms "include" and/or "comprise" used in this specification specify the presence of features, steps, operations, devices, components, and/or of combinations thereof.

Unless specifically stated otherwise, the relative arrangement of components and steps, numerical expressions, and numerical values set forth in these embodiments do not limit the scope of the present disclosure. In addition, it should be clear that, for ease of description, sizes of the various components shown in the accompanying drawings are not drawn according to actual proportional relationships. Technologies, methods, and devices known to those of ordinary skill in the relevant fields may not be discussed in detail, but where appropriate, the technologies, methods, and devices should be considered as a part of the authorization specification. In all the examples shown and discussed herein, any specific value should be interpreted as merely being exemplary rather than limiting. Therefore, other examples of the exemplary embodiment may have different values. It should be noted that similar reference signs and letters represent similar items in the accompanying drawings below. Therefore, once an item is defined in one accompanying drawing, the item does not need to be further discussed in a subsequent accompanying drawing.

In the description of the present disclosure, it should be noted that orientations or position relationships indicated by orientation terms "front, rear, upper, lower, left, and right", "transverse, vertical, perpendicular, and horizontal", "top and bottom", and the like are usually based on orientations or position relationships shown in the accompanying drawings, and these terms are only used to facilitate description of the present disclosure and simplification of the description. In the absence of description to the contrary, these orientation terms do not indicate or imply that the apparatus or element referred to must have a specific orientation or be constructed and operated in a specific orientation, and therefore cannot be understood as a limitation on the protection scope of the present disclosure: orientation words "inner and outer" refer to the inside and outside relative to the contour of each component.

For ease of description, spatially relative terms such as "on", "over", "on the upper surface", and "above" can be used here, to describe a spatial positional relationship between one device or feature and another device or feature shown in the figures. It should be understood that the spatially relative terms are intended to include different orientations in use or operation other than the orientation of the device described in the figure. For example, if the device in the figure is inverted, the device described as "above another device or structure" or "on another device or structure" is then be positioned as being "below another device or structure" or "beneath a device or structure". Therefore, the exemplary term "above" can include both orientations "above" and "below". The device can also be positioned in other different ways (rotates by 90 degrees or in another orientation), and the spatially relative description used herein is explained accordingly.

In addition, it should be noted that using terms such as "first" and "second" to define components is only for the convenience of distinguishing the corresponding components. Unless otherwise stated, the foregoing words have no special meaning and therefore cannot be understood as a limitation on the protection scope of the present disclosure.

As shown in the figures, the present disclosure provides a method for preventing the accumulation of cylinder oil at scavenging ports of low-speed marine engines, wherein an oil passage 4 is arranged on a cylinder wall inside a cylinder 1 is to avoid the accumulation of the cylinder lubricating oil at the scavenging port upper edge of low-speed two-stroke marine engine.

The oil passage 4 includes a plurality of oil storage grooves 41 processed in a circumferential direction of the cylinder wall 1; the oil passage 4 is formed by obliquely extending from an inner side of the cylinder wall 1 and towards the outside of the cylinder in a radial direction of the cylinder; the scavenging ports 5 are uniformly distributed in a circumferential direction of the cylinder wall 1; each of the oil storage grooves 41 is correspondingly processed at an upper portion of a scavenging port upper edge 2 of the scavenging port 5, and each of the oil storage grooves 41 has a shape matching a curved surface of the scavenging port upper edge 2; and the adjacent oil storage grooves 41 are in tangential communication with each other at the bottom; or, oil discharge grooves 42 are provided between the scavenging port side edges 3 of the adjacent scavenging ports 5, and the top of the oil discharge groove 42 is in communication with the bottoms of the two adjacent oil storage grooves 41.

When the adjacent oil storage grooves 41 are in tangential communication with each other at the bottom, the residual cylinder oil is discharged from the oil groove through the tangent position, and the oil passage 4 is a short oil passage arranged at the upper portion of the scavenging port upper edges 2 in a "wavy" shape; and the shape of the oil passage 4 is matched with the shape of the scavenging port upper edge 2.

When oil discharge grooves 42 are provided between the scavenging port side edges 3 of the adjacent scavenging ports 5 and the top of the oil discharge groove 42 is in communication with the bottoms of the two adjacent oil storage grooves 41, the oil passage 4 is a long oil passage, i.e. the adjacent oil grooves intersect and run through to form an oil groove at the cylinder wall between the adjacent scavenging ports, and a tip outlet is provided at the bottom of the oil groove.

This oil passage 4 is arranged at the upper portion of the scavenging port upper edge 2 and outside the scavenging port side edge 3 in an "arch" shape; and the shape of the upper portion of the oil passage 4 is matched with the shape of the scavenging port upper edge 2.

The bottom of the oil discharge groove 42 exceeds the scavenging port 5, and the residual cylinder oil is discharged from the oil groove through the tip outlet.

For convenient storage of cylinder oil, an upper surface and a lower surface of the oil passage 4 are parallel; an angle between the upper surface and the cylinder wall 1 is an obtuse angle of $\alpha$, and $100°\leq\alpha\leq110°$; an angle between the lower surface and the cylinder wall 1 is an acute angle of $\beta$, and $70°\leq\beta\leq80°$; and a groove depth along the upper surface and the lower surface towards the inner part of the cylinder wall is 2 to 5 mm.

For convenient storage of cylinder oil, a connection between the upper surface of the oil passage 4 and the cylinder wall 1 is provided with an upper notch transition chamfer 6, a connection between the lower surface of the oil passage 4 and the cylinder wall 1 is provided with a lower notch transition rounded corner 7, and the inner portion of the oil passage 4 is provided with a groove rounded corner 8.

A width of the oil passage 4 is 2 to 5 mm, and a distance between the oil passage 4 and an outer edge contour of the scavenging port 5 is 2 to 5 mm. Or according to different engine types, the width of the oil passage 4 is $L_1$, the distance between the oil passage 4 and the outer edge contour of the scavenging port 5 is $L_2$, a long axis length of the scavenging port is H, and $0.02H\leq L_1\leq0.05H$, $0.02H\leq L_2\leq0.05H$, i.e. the width of the oil groove and the distance between the oil passage and the outer edge contour of the scavenging port should be 2% to 5% of the long axis length of the scavenging port. The outer edge contour of the scavenging port includes the scavenging port upper edge 2 and the scavenging port side edge 3.

Besides, the present disclosure also discloses a processing method for a low-speed two-stroke marine engine scavenging port with an oil passage; on the basis of the existing ordinary scavenging port, the structure of the oil passage 4 in the present disclosure is processed.

The present disclosure provides a solution for accumulation and blowing of cylinder oil near the scavenging ports of the low-speed two-stroke marine engine. Because the cylinder diameters of different engines and the number and the size of the scavenging ports are not consistent, the specific size of the oil groove is only for reference, but it should ensure that the depth of the oil groove does not affect the structural stability of the cylinder wall. If the short oil passage is adopted, as shown in Embodiment 1, it should ensure that the oil grooves envelop outside the scavenging port upper edge; and if the long oil passage is adopted, as shown in Embodiment 2, it should ensure that the upper portions of the oil grooves envelop outside the scavenging port upper edge, and the lower portions of the oil grooves intersect between the adjacent scavenging ports and exceeds the scavenging port.

Generally, at the moment the scavenging port is opened (about 150° CA), the instantaneous speed of the airflow entering into the cylinder through the scavenging port reaches the maximum; at this time, because of the small opening of the scavenging port, only the cylinder oil accumulated at the scavenging port upper edge 2 is stripped into the cylinder; at the same time, the speed drops sharply after the opening of the scavenging port is increased, the lubricating oil at the scavenging port side edge 3 will not be stripped.

Specially, for some special engine types, due to the great pressurization pressure, the cylinder oil is very likely to be stripped under the condition of large opening of the scavenge port, so a long oil passage is needed to avoid excessive accumulation of cylinder oil at the side edge 3 and stripping.

Specially, for some special engine types, due to the better lubricating conditions and less lubricating oil consumption, the lubricating oil is not easy to accumulate near the scavenging port, and there is no need to process a too-long oil passage.

Specially, for some special engine types, due to the thinner cylinder wall, a too-long oil passage may affect the structural strength of the engine itself, so too-long oil passage cannot be processed.

Specially, for some special engine types, due to a higher cost requirement and better lubricating conditions, processing too-long oil passage will increase the cost, so it is not necessary to process too-long oil passage.

The present disclosure relates the control and optimization field of the large low-speed two-stroke marine engine. By using simple mechanical processing, the probability of pre-ignition of cylinder oil in the cylinder is effectively reduced. The present disclosure has the advantages of simple structure, convenient transformation, and strong applicability, and is of great significance for the further improvement and development of the low-speed two-stroke marine engine.

Auto-ignition of cylinder oil is the main inducement of pre-ignition of low-speed two-stroke dual-fuel marine engine and an important source of the PM emission at the same time. For a low-speed two-stroke marine engine, the accumulation of cylinder oil at the scavenging port and the blowing of scavenging gas is one of the main sources of freely distributed cylinder oil droplets in the cylinder. In order to prevent the accumulation and being stripped under the blowing of scavenging gas of cylinder oil near the scavenging port, by setting an inclined oil groove on the cylinder wall near the outer contour of the scavenging port upper edge, the cylinder oil scraped by the piston to near the scavenging port upper edge is stored and leaks down along the cylinder wall, which effectively avoids the lubricating oil remaining on the cylinder wall accumulating at the scavenging port upper edge under the reciprocating motion of the piston, to avoid being blown into the cylinder in the scavenging process of the next stroke to form the potential spontaneous combustion point. The present disclosure effectively avoids the cylinder oil near the scavenging port upper edge being stripped through simple processing and transformation of the engine cylinder wall, greatly reducing the harm of pre-ignition, and is of great significance to the improvement of the performance and safety of the large two-stroke low-speed marine engine.

The method for preventing accumulation of cylinder oil at scavenging ports of a low-speed marine engine in the present disclosure is a method to avoid the accumulation of lubricating oil at the scavenging port upper edge of low-speed two-stroke marine engine by arranging an oil groove, and the oil groove arrangement and processing method thereof.

Embodiment 1 (Short Oil Passage)

Figure 4:
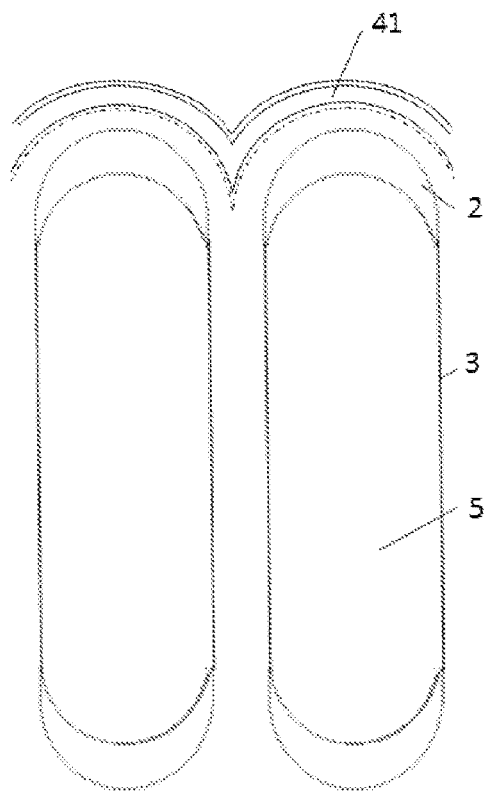
FIG. 4 is a schematic diagram of Embodiment 1 (short oil passage) of the present disclosure.
Figure 8:
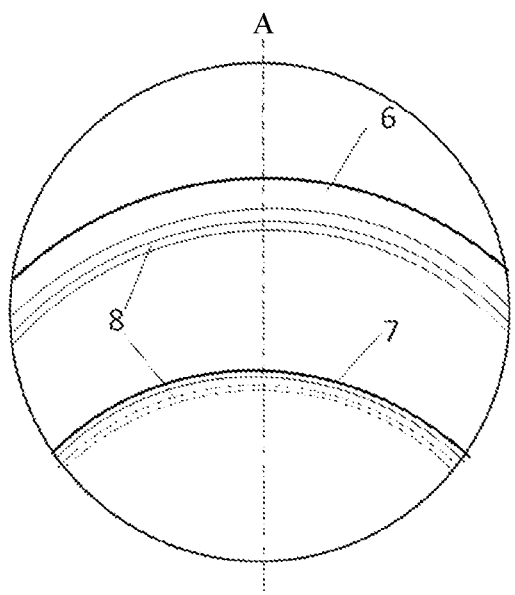
FIG. 8 is an enlarged schematic diagram at portion A of FIG. 6.
Figure 9:
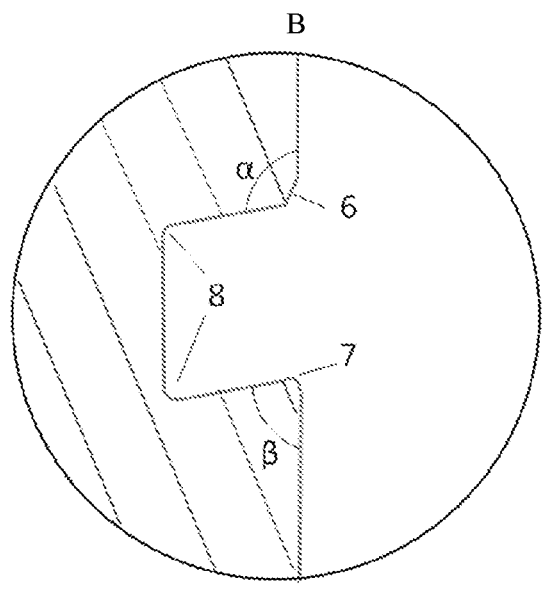
FIG. 9 is an enlarged schematic diagram at portion B of FIG. 7.

As shown in FIGS. 1, 4, and 6 to 9, the embodiment discloses a method for preventing the accumulation of cylinder oil at scavenging ports of low-speed marine engine, wherein an oil passage 4 is arranged on the cylinder wall 1 inside the cylinder to avoid the accumulation of cylinder lubricating oil at the scavenging ports of low-speed two-stroke marine engine.

The oil passage 4 includes a plurality of oil storage grooves 41 processed in the circumferential direction of the cylinder wall 1. The oil passage 4 is formed by obliquely extending from the inner side of the cylinder wall 1 towards the outside of the cylinder in the radial direction of the cylinder. The scavenging ports 5 are uniformly distributed in the circumferential direction of the cylinder wall 1; each of the oil storage grooves 41 is correspondingly processed at the upper portion of the scavenging port upper edge 2 of the scavenging port 5, and each of the oil storage grooves 41 has a shape matching the curved surface of the scavenging port upper edge 2. The adjacent oil storage grooves 41 are in tangential communication with each other at the bottom, and the oil passage is a short oil passage arranged at the upper portion of the scavenging port upper edge 2 in a "wavy" shape. The shape of the oil passage 4 is matched with the shape of the scavenging port upper edge 2.

The upper surface and the lower surface of the oil passage 4 are parallel; the angle between the upper surface and the cylinder wall 1 is an obtuse angle of $\alpha$, and the angle between the lower surface and the cylinder wall 1 is an acute angle of $\beta$. In the embodiment, the obtuse angle of $\alpha$ is 100°, and the acute angle of $\beta$ is 80°. The groove depth along the upper surface and the lower surface towards the inner portion of the cylinder wall is 3 mm.

The connection between the upper surface of the oil passage 4 and the cylinder wall 1 is provided with an upper notch transition chamfer 6; the connection between the lower surface of the oil passage 4 and the cylinder wall 1 is provided with a lower notch transition rounded corner 7; and the inner portion of the oil passage 4 is provided with a groove rounded corner 8.

The width of the oil passage 4 is 3 mm, and the distance between the oil passage 4 and the outer edge contour of the scavenging port 5 is 3 mm; the outer edge contour includes the scavenging upper edge 2 and the scavenging side edge 3.

Preferably, the width of the oil passage 4 and the distance between the oil passage 4 and the outer edge contour of the scavenging port 5 are $L_1$ and $L_2$ respectively; the long axis length of the scavenging port is H, and $L_1=L_2=0.03H$.

Embodiment 2

Compared with Embodiment 1, the embodiment is different in that the obtuse angle of $\alpha$ is 110°, and the acute angle of $\beta$ is 70°, and the groove depth along the upper surface and the lower surface towards the inner portion of the cylinder wall is 2 mm.

And the width of the oil passage 4 is 2 mm; the distance between the oil passage 4 and the outer edge contour of the scavenging port 5 is 2 mm.

The width of the oil passage 4 and the distance between the oil passage 4 and the outer edge contour of the scavenging port 5 are $L_1$ and $L_2$ respectively; the long axis length of the scavenging port is H, and $L_1=L_2=0.02H$.

Embodiment 3 (Long Oil Passage)

Figure 5:
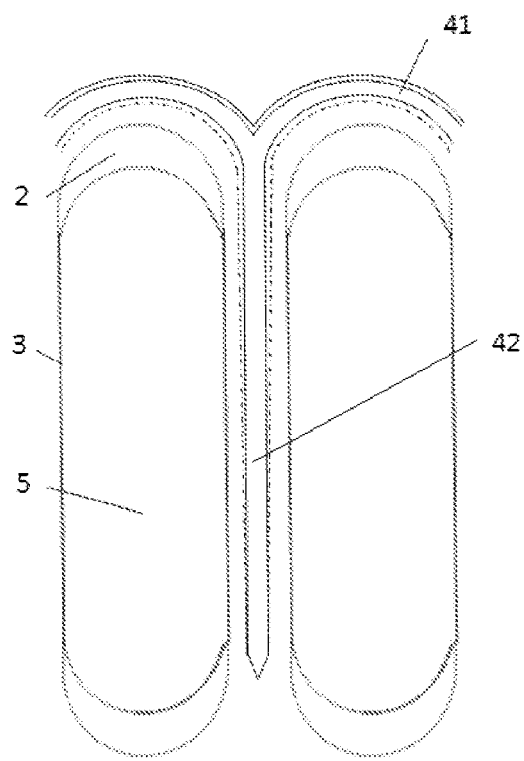
FIG. 5 is a schematic diagram of Embodiment 3 (long oil passage) of the present disclosure.

As shown in FIGS. 1, 3, and 5 to 9, the embodiment discloses a method for preventing the accumulation of cylinder oil at scavenging ports of low-speed marine engine, wherein an oil passage 4 is arranged on the cylinder wall 1 inside the cylinder to avoid the accumulation of cylinder lubricating oil at the scavenging ports of low-speed two-stroke marine engine.

The oil passage 4 includes a plurality of oil storage grooves 41 processed in the circumferential direction of the cylinder wall 1. The oil passage 4 is formed by obliquely extending from the inner side of the cylinder wall 1 towards the outside of the cylinder in the radial inclination of the cylinder. The scavenging ports 5 are uniformly distributed in the circumferential direction of the cylinder wall 1; each of the oil storage grooves 41 is correspondingly processed at the upper part of the scavenging port upper edge 2 of the scavenging port 5, and each of the oil storage grooves 41 has a shape matching the curved surface of the scavenging port upper edge 2.

The oil discharge grooves 42 are provided between the scavenging port side edges 3 of the adjacent scavenging ports 5, and the top of the oil discharge groove 42 is in communication with the bottoms of the two adjacent oil storage grooves 41, and the oil passage 4 is long oil passage arranged at the upper portion of the scavenging port 5 upper edge 2 and outside the scavenging port side edge 3 in an "arch" shape. The shape of the upper portion of the oil passage 4 is matched with the shape of the scavenging port upper edge 2, and the bottom of the oil discharge groove 42 exceeds the scavenging port 5.

The upper surface and the lower surface of the oil passage 4 are parallel; the angle between the upper surface and the cylinder wall 1 is an obtuse angle of α, and the angle between the lower surface and the cylinder wall 1 is an acute angle of β. In the embodiment, the obtuse angle of α is 100°, and the acute angle of β is 80°. The groove depth along the upper surface and the lower surface towards the inner portion of the cylinder wall is 3 mm.

The connection between the upper surface of the oil passage 4 and the cylinder wall 1 is provided with an upper notch transition chamfer 6; the connection between the lower surface of the oil passage 4 and the cylinder wall 1 is provided with a lower notch transition rounded corner 7; and the inner portion of the oil passage 4 is provided with a groove rounded corner 8.

The width of the oil passage 4 is 3 mm, and the distance between the oil passage 4 and the outer edge contour of the scavenging port 5 is 3 mm; the outer edge contour includes the scavenging upper edge 2 and the scavenging side edge 3.

Preferably, the width of the oil passage 4 and the distance between the oil passage 4 and the outer contour of the scavenging port 5 are $L_1$ and $L_2$, and the long axis length of the scavenging port is H, and $L_1=L_2=0.03H$.

Embodiment 4

Compared with Embodiment 3, the embodiment is different in that the obtuse angle of α is 110°, and the acute angle of β is 70°, and the groove depth along the upper surface and the lower surface towards the depth of the inner portion of the cylinder wall is 5 mm.

And the width of the oil passage 4 is 5 mm; the distance between the oil passage 4 and the outer edge contour of the scavenging port 5 is 5 mm.

The width of the oil passage 4 and the distance between the oil passage 4 and the outer edge contour of the scavenging port 5 are $L_1$ and $L_2$ respectively; the long axis length of the scavenging port is H, and $L_1=L_2=0.05H$.

At last, it should be stated that the above various embodiments are only used to illustrate the technical solutions of the present invention without limitation; and despite the reference to the aforementioned embodiments to make a detailed description of the present invention, those of ordinary skilled in the art should understand: the described technical solutions in above various embodiments may be modified or the part of or all technical features may be equivalently substituted; while these modifications or substitutions do not make the essence of their corresponding technical solutions deviate from the scope of the technical solutions of the embodiments of the present disclosure.

The invention claimed is:

1. A method for preventing accumulation of cylinder oil at scavenging ports of a marine engine, comprising:
   removing cylinder oil through a plurality of oil passages on a cylinder wall inside a cylinder;
   wherein:
   the cylinder comprises a plurality of scavenging ports spaced apart in a circumferential direction of the cylinder, and each oil passage comprises an oil storage groove disposed about an upper edge of a corresponding scavenging port;
   the oil storage groove obliquely extends from an inner side of the cylinder wall towards an outside of the cylinder in a radial direction of the cylinder; and
   two adjacent oil storage grooves are tangentially connected with each other at a connection point.

2. The method according to claim 1, wherein an upper surface and a lower surface of each oil storage groove are parallel to each other, an angle between the upper surface and an inner surface of the cylinder wall is an obtuse angle of α, and $100°≤α≤110°$, an angle between the lower surface and the inner surface of the cylinder wall is an acute angle of β, and $70°≤β≤80°$, and a depth of each oil storage groove is 2 to 5 mm.

3. The method according to claim 2, wherein the upper surface of each oil storage groove is connected to the inner surface of the cylinder wall through an upper notch transition chamfer and the lower surface of the each oil storage groove is connected to the inner surface of the cylinder wall through a lower notch transition rounded corner, and a bottom of each oil storage groove is provided with a groove rounded corner.

4. The method according to claim 1, wherein each oil passage further comprises an oil discharge groove extending along a vertical direction of the cylinder wall from the connection point between two adjacent oil storage grooves.

5. The method according to claim 4, wherein an end of each oil discharge groove is disposed lower than a lower edge of the corresponding scavenging port.

6. The method according to claim 1, wherein a width of each oil passage is 2 to 5 mm, and a distance between each oil passage to an outer edge of the corresponding scavenging port is 2 to 5 mm.

7. The method according to claim 1, wherein $L_1$ represents a width of the oil passage, $L_2$ represents a distance between the oil passage and an outer edge of the corresponding scavenging port, H represents a long axis length of the scavenging port, and $0.02H≤L_1≤0.05H$, $0.02H≤L_2≤0.05H$.

* * * * *